No. 751,679. PATENTED FEB. 9, 1904.
H. B. NICHOLS.
RAIL SAWING MACHINE.
APPLICATION FILED AUG. 27, 1903.
NO MODEL. 4 SHEETS—SHEET 1.
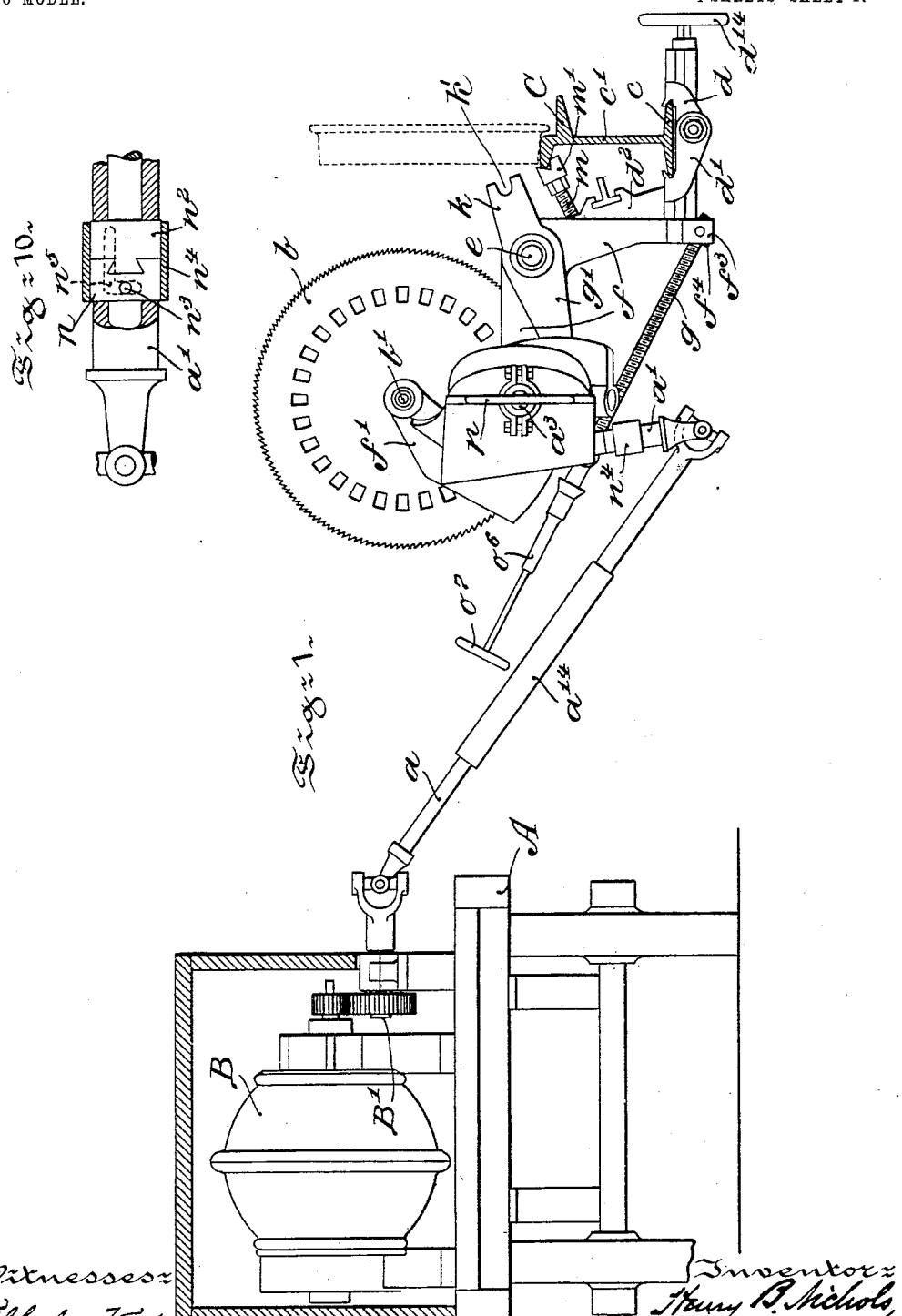

No. 751,679. PATENTED FEB. 9, 1904.
H. B. NICHOLS.
RAIL SAWING MACHINE.
APPLICATION FILED AUG. 27, 1903.
NO MODEL. 4 SHEETS—SHEET 2.
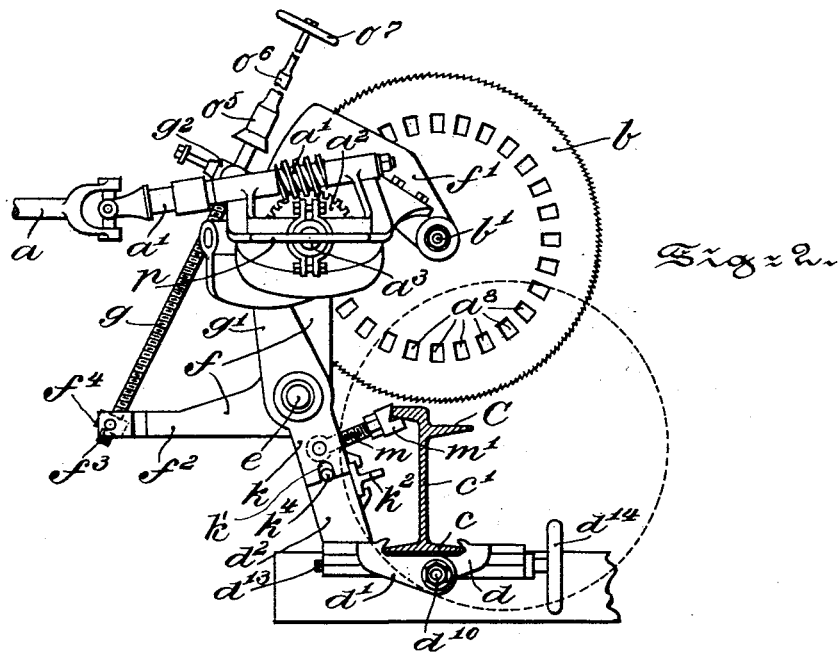
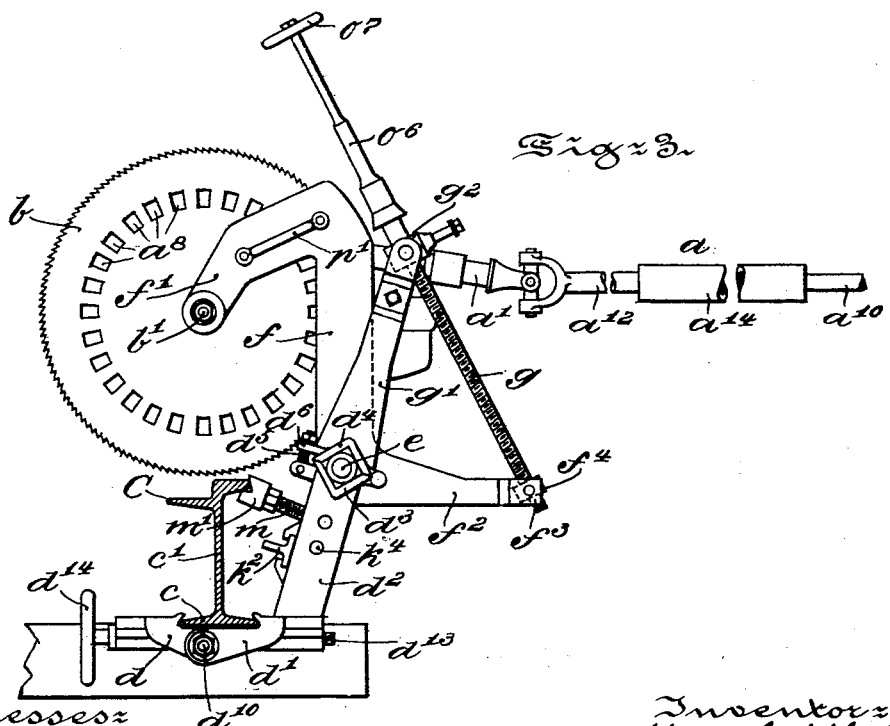

No. 751,679. PATENTED FEB. 9, 1904.
H. B. NICHOLS.
RAIL SAWING MACHINE.
APPLICATION FILED AUG. 27, 1903.
NO MODEL. 4 SHEETS—SHEET 3.
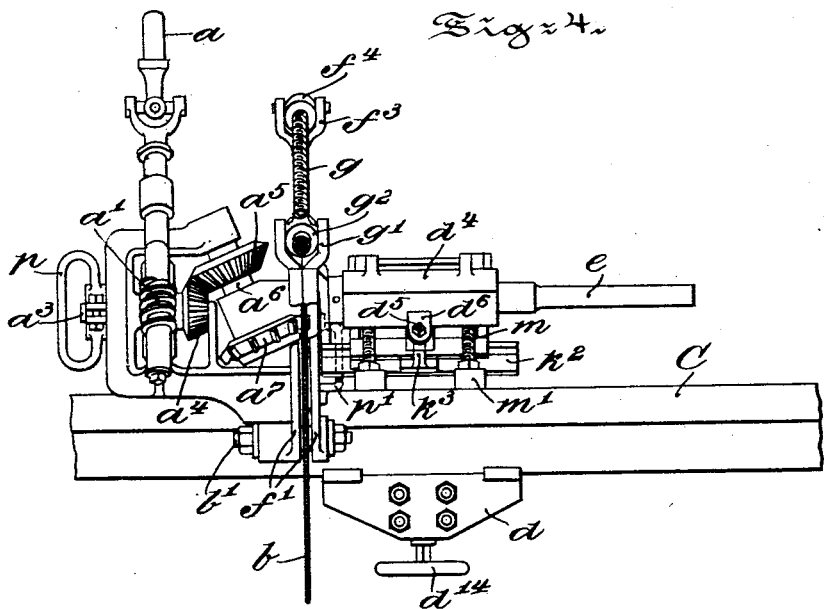
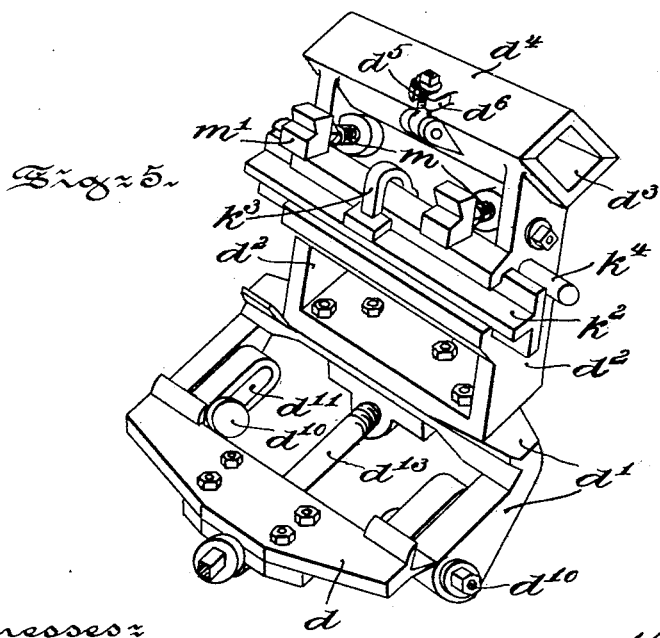

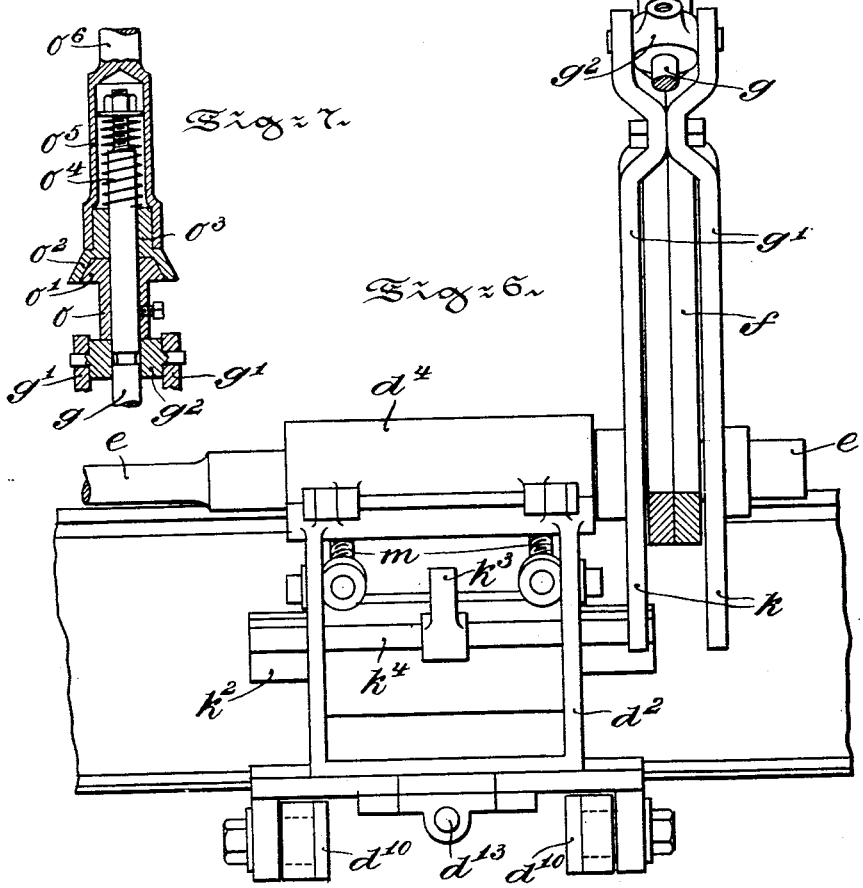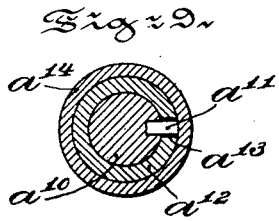

No. 751,679.                                              Patented February 9, 1904.

UNITED STATES PATENT OFFICE.

HENRY B. NICHOLS, OF PHILADELPHIA, PENNSYLVANIA.

RAIL-SAWING MACHINE.

SPECIFICATION forming part of Letters Patent No. 751,679, dated February 9, 1904.

Application filed August 27, 1903. Serial No. 170,910. (No model.)

*To all whom it may concern:*

Be it known that I, HENRY B. NICHOLS, a citizen of the United States, residing at the city of Philadelphia, in the county of Philadelphia and State of Pennsylvania, have invented certain new and useful Improvements in Rail-Sawing Machines, of which the following is a specification.

My invention has relation to a machine for sawing metal generally, but which is especially adapted for sawing railway-rails while said rails form part of the roadway of an electrical or steam railroad, and in such connection it relates to the construction and arrangement of such a sawing-machine.

Heretofore in taking out a section of a rail in the repair or replacement of said rail the almost universal practice was to use a straight saw and to perform the operation manually. As can be readily understood, the operation was tedious and lengthy and unless great care was exercised by the operator the cut made by the saw was far from true. Where cars were passing frequently over the road-bed, delays in the running of the cars, as well as in the completion of the sawing, were of frequent occurrence.

The principal object of my invention is to adapt a power-driven circular saw for use in sawing metal, such as railway-rails, and to so arrange said saw, the motor, and the auxiliary parts of the machine that the entire machine is portable. The sawing mechanism is readily attachable to or detachable from that part of the rail adjacent to the portion to be cut. The rail itself forms the support for the sawing mechanism, and the operating parts of the sawing mechanism, while said mechanism is still supported by the rail, may be so moved away from the rail as to permit of the passage of a car over the rail whenever desired.

In carrying out the object of my invention there are certain elements which for the purpose of sawing railway-rails have been preferably constructed and arranged as hereinafter described and as illustrated in the drawings.

The nature and scope of my invention will be more fully understood from the following description, taken in connection with the accompanying drawings, forming part hereof, in which—

Figure 1 is a side elevational view, partly in section, of a machine for sawing railway-rails embodying main features of my invention, the saw being illustrated as thrown back away from the rail. Fig. 2 is a side elevational view of the saw and its auxiliary parts, illustrating the saw supported by the rail in position for cutting the rail. Fig. 3 is a view similar to Fig. 2, but illustrating the opposite side of said saw and auxiliary parts. Fig. 4 is a top or plan view of Fig. 2, a portion of the saw-frame being broken away. Fig. 5 is a perspective view of the supporting-frame and clamping means for supporting the saw upon the rail. Fig. 6 is an enlarged rear elevational view of the supporting and clamping means and of the bracket supporting the saw. Fig. 7 is a detail view, enlarged, illustrating the construction of the spindle for feeding the saw toward the work. Fig. 8 is a detail view, enlarged, illustrating the construction of the extensible power-shaft connecting the saw-operating means with the driving-shaft of the motor. Fig. 9 is a cross-sectional view taken on the line 9 9 of Fig. 8, and Fig. 10 is a detail view illustrating the detachable coupling between the worm-shaft of the saw and the power-shaft.

Referring to the drawings in Fig. 1, A represents a truck upon which is suitably mounted for transportation a motor B, arranged to drive the main shaft B' in any suitable manner. Connected with the main shaft B' by a universal joint is one end of the shaft $a$, the other end of the shaft being similarly connected by a universal joint with a worm-shaft $a'$, arranged, as hereinafter described, to drive a circular saw $b$.

Referring now to the remaining figures, the base $c$ of a rail C is tightly clamped between two plates $d$ and $d'$. To one of said plates $d'$ is secured a box-shaped frame $d^2$, which projects obliquely upward from the plate $d'$ to one side of the web $c'$ of the rail C and terminating approximately at the head of the rail C in a bearing-block $d^3$, which in cross-section is of substantially V shape. To one side of this bearing-block $d^3$ is hinged the complementally-formed bearing-block $d^4$, arranged to be locked down upon the block $d^3$ by the swing-bolt $d^5$ and keeper $d^6$, arranged upon the other side of the blocks $d^3$ $d^4$. The two blocks $d^3$ $d^4$ when locked form a bearing of rectangular or square shape in cross-section and arranged to receive a shaft $e$. By forming the bearing as above described the shaft $e$ can be readily introduced into the bearing or removed therefrom or adjusted laterally therein, and when introduced it is tightly clamped in the bearing. All dust or dirt entering the bearing will fall to the angular lower edge of the bearing and will not bind upon the shaft $e$. The shaft $e$ forms an axis or support upon which a Z-shaped frame $f$ may oscillate. The frame $f$, as clearly illustrated in Figs. 4 and 6, is preferably made in two sections, with its front end $f'$ forked or separated to receive the saw $b$, the axis or arbor $b'$ of which saw is supported by the free end $f'$ of the frame $f$. The rear end $f^2$ of the frame $f$ also terminates in a fork $f^3$, in which is swiveled a nut $f^4$ threaded to receive the end of a spindle $g$, for a purpose to be hereinafter described.

Upon the shaft $e$ as an axis or support is arranged a forked bracket $g'$, carrying at its free end a collar $g^2$, swiveled in said free end and in which the spindle $g$ loosely turns. Inasmuch as the bracket $g'$ is normally fixed to the axis $e$, while the frame $f$ may oscillate thereon it follows that when the spindle $g$ is turned in one direction in the collar $g^2$ of the bracket $g'$ the rear end $f^2$ of the frame $f$ will be elevated toward the bracket $g'$ as the threaded portion of the spindle $g$ advances in the nut $f^4$. When the frame $f$ of the saw $b$ is so elevated, the end $f'$ of the frame $f$ is swung forward and downward to bring the saw $b$ toward the rail C. The spindle $g$, in conjunction with the bracket $g'$, collar $g^2$, and the end $f^2$ of the frame $f$, serve as the feeding mechanism for the saw $b$.

A preferred means for driving the saw $b$ consists as follows: The shaft $a'$, as above described, is driven by the shaft $a$, connecting the shaft $a'$ with the main shaft B' of the motor B. The worm on the shaft $a'$ meshes with a gear $a^2$, secured to a short shaft $a^3$, on the end of which is placed a miter-gear $a^4$, meshing with a miter-gear $a^5$, arranged on a shaft $a^6$. The shaft $a^6$ projects through suitable bearings at an angle to the face of the saw $b$ and has at its end a sprocket-gear $a^7$ engaging recesses or openings $a^8$ extending into or through the face of the saw $b$. The bearings for the shaft $a'$, short shaft $a^3$, and angular shaft $a^6$ are all carried by the frame $f$, supporting the saw $b$. Inasmuch, therefore, as the frame $f$ has an oscillating motion upon the shaft $e$ as an axis, it follows that the shaft $a'$ should be connected with the main shaft B' by a shaft $a$ which is extensible or telescoping. One way of making the shaft $a$ telescoping is illustrated in detail in Figs. 8 and 9 and consists as follows: The universal joint connecting one end of the shaft $a$ with the shaft B' is carried by a solid bar $a^{10}$, having a key $a^{11}$ on its exterior. This bar $a^{10}$, with its key $a^{11}$, slides into the hollow portion $a^{12}$ of the other end of the shaft $a$, which carries the second universal joint for connection of the shaft $a$ with the shaft $a'$. This hollow portion $a^{12}$ is slotted, as at $a^{13}$, longitudinally to receive the key $a^{11}$ and to thereby permit the bar $a^{10}$ to slide into the hollow portion $a^{12}$, while, however, locking them, so that they will turn in unison. A sleeve $a^{14}$, arranged over the slotted hollow portion $a^{12}$ of the shaft $a$, protects the joint between the portions $a^{10}$ and $a^{12}$ from the entrance of dust and dirt. The sleeve $a^{14}$ serves also to reinforce or strengthen the slotted hollow portion $a^{12}$ and to prevent the breakage of the portion $a^{12}$ under torsion of the shaft $a$.

As hereinbefore stated, the bracket $g'$ normally is fixed upon the axis or support $e$ to enable the proper feeding of the frame $f$ and saw $b$ down upon the work C. When the operation of sawing is interrupted by the passage of a car, it is necessary to move back the saw $b$ and its frame $f$. If now the bracket $g'$ were permanently fixed, the entire support for the saw $b$ would have to be loosened from the rail C to permit of the withdrawal of the saw. Such a proceeding would, however, not only be tedious and require considerable time, but it would require the reassembling of all the parts in the precise position which they occupied prior to the withdrawal of the saw $b$ in order that the saw might continue to cut in the same groove or channel in the rail C in which it was previously cutting. There is hence provided a means whereby without disturbing the support clamped to the rail C, the saw $b$, its frame $f$, feeding-spindle $g$, the shafts and gearing carried by the frame $f$, and the bracket $g'$ may be tilted backward upon the axis $e$. To accomplish this, the lower ends of the bracket $g'$ are extended in the form of arms $k$, extending below the shaft $e$ and having, preferably, in one of said arms a slot $k'$. Sliding in the box-shaped frame $d^2$ is a bar $k^2$, connected by a yoke $k^3$ with a bolt $k^4$. When the bracket $g'$ is to be maintained rigidly upon the shaft $e$, the arm $k$ is locked to the slide-bar $k^2$ by pushing said bar in the frame $d^2$ until the bolt $k^4$ enters the slot $k'$, as shown in Fig. 2. When, however, the saw $b$ and its accessories are to be tilted backward upon the shaft $e$, the bar $k^2$ and bolt $k^4$ are retracted to release the arm $k$, and the bracket $g'$ is thus free to move with the saw and its frame $f$, as illustrated in Fig. 1. As previously explained, the bearing for the shaft $e$ is carried by the frame $d^2$, projecting from one of the clamp-plates $d'$, engaging the base of the rail C. The two plates $d$ and $d'$, as illustrated in Fig. 5, are connected by bolts $d^{10}$, passing through one plate $d'$ and through slotted extensions $d^{11}$ of the other plate. A spindle $d^{13}$, bearing against the plate $d$ and screw-threaded in plate $d'$, serves when turned by a hand-wheel $d^{14}$ to advance the plates $d$ and $d'$ toward each other to clamp the base of the rail C between the plates. To more securely hold the frame $d^2$ to the rail C, there are secured to the frame $d^2$ adjacent to the head or tread of the rail C the jacking-bolts $m$, each having a cut-away head $m'$, adapted when the bolts $m$ are turned to abut against the head of the rail C, as clearly illustrated in Figs. 1, 2, and 3. The support for the saw $b$ and its accessories is therefore tightly connected to the rail C at three points, which serves to rigidly support the saw $b$ and parts when the saw is in operation.

To permit when desired the detachment of the saw $b$ and its operating parts from the connecting telescoping shaft $a$, a detachable coupling may be used upon the shaft $a'$, the preferred construction of which is illustrated in detail in Fig. 10. The shaft $a'$ proper has an enlargement or head $n$, engaging or dovetailing in a complemental-formed recess of a continuation $n^2$ of the shaft $a'$. The head $n$ has a pin $n^3$, arranged to enter and interlock with a sleeve $n^4$, surrounding the dovetailed joint, by passing through a bayonet-slot $n^5$, as will be readily understood.

In the feeding down of the saw $b$ upon the work C it may happen that the operator will turn the spindle $g$ too rapidly, and thereby break the saw. To overcome this, the upper portion of the spindle $g$ is made, preferably, as illustrated in Fig. 7. In this construction to the spindle $g$ is keyed or otherwise secured a collar $o$, having a frusto-conical head $o'$, fitting into a correspondingly-shaped seat $o^2$, formed in a block $o^3$, loosely surrounding the spindle $g$. A spring $o^4$ forces the block $o^3$ downward, so that the head $o'$ and seat $o^2$ are frictionally connected. The block $o^3$ is carried by a sleeve $o^5$, terminating in a shaft $o^6$, to which a hand-wheel $o^7$ is secured. It follows that if the hand-wheel $o^7$ is turned too rapidly the seat $o^2$ will turn loosely around the head $o'$, and the frictional engagement between the parts $o'$ and $o^2$ of the spindle being broken the spindle proper will not turn.

The shaft or axis $e$, on which the saw-frame $f$ oscillates, can be readily shifted in a longitudinal direction in its bearing to bring the saw $b$ to the proper point on the rail C, at which point the rail C is to be cut. The shaft or axis $e$ can be readily removed from its bearing, carrying with it the bracket $g'$, saw $b$, and saw-frame $f$, together with the accessory parts. This is important in handling the various parts of the machine, for if all parts were inseparably united the machine could not be packed upon the truck A for transportation.

To assist in handling the saw $b$, saw-frame $f$, and auxiliary parts when the same are removed from the box-shaped frame $d^2$, handles $p$ and $p'$ are provided on the frame $f^2$, as shown in the drawings.

Having thus described the nature and object of my invention, what I claim as new, and desire to secure by Letters Patent, is—

1. In a machine of the character described, a support arranged to be clamped to the under face of the work and projecting upward to one side of said work in the form of a bearing, a shaft removably secured in said bearing, a saw-frame arranged to oscillate on said shaft, and a circular saw arranged to rotate in said frame.

2. In a machine of the character described, a support arranged to be clamped to the under face of the work and projecting obliquely upward to one side of the work in the form of a bearing, a shaft removably secured in said bearing and laterally adjustable therein, a saw-frame arranged to oscillate upon said shaft, a circular saw rotating in said saw-frame above the work, and means carried by said frame for rotating said saw.

3. In a machine for sawing railway-rails, a support arranged to be detachably secured to the under face of the rail and projecting upward to one side of said rail to form a bearing, a shaft detachably supported in said bearing, a bracket rigidly connected to said shaft, a frame arranged to oscillate upon said shaft, a saw arranged to rotate in said frame, and a mechanism connecting the frame with said bracket and arranged to feed the frame and saw toward the rail.

4. In a machine for sawing railway-rails, a support arranged to be detachably secured to the rail and projecting upward to one side of said rail to form a bearing, a shaft supported in said bearing, a frame arranged to swing upon said shaft, a saw and operating mechanism for said saw carried by said frame, a mechanism adapted to feed the frame and saw toward or away from the rail, said feeding mechanism arranged to swing with the frame and saw in one direction away from the rail to clear the rail for the passage of a car or other vehicle, and a locking mechanism normally arranged to hold the frame, saw and feeding mechanism in operative position with respect to the rail and to prevent clearance movement of said frame, saw and feeding mechanism away from said rail.

In testimony whereof I have hereunto set my signature in the presence of two subscribing witnesses.

HENRY B. NICHOLS.

Witnesses:
  J. WALTER DOUGLASS,
  THOMAS M. SMITH.